(No Model.)
J. H. SMITH.
GOVERNOR FOR MARINE ENGINES.
No. 264,356. Patented Sept. 12, 1882.
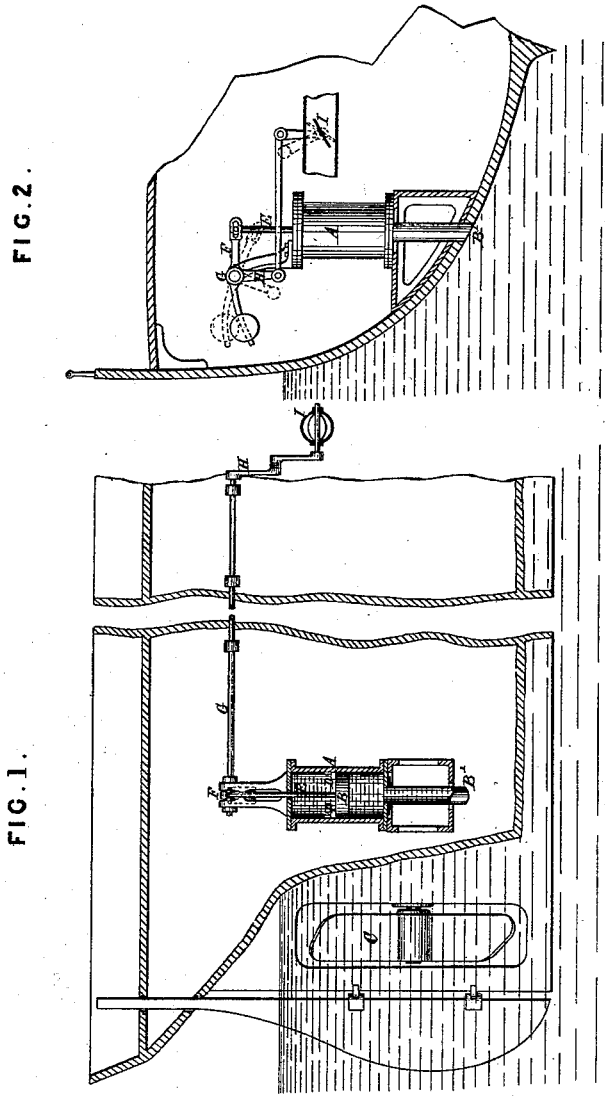
Witnesses.
J. A. Rutherford
Robert Everett
Inventor.
James H. Smith,
By James L. Norris.
Atty.

UNITED STATES PATENT OFFICE.

JAMES HENRY SMITH, OF EUSTON ROAD, COUNTY OF MIDDLESEX, ENGLAND.

GOVERNOR FOR MARINE ENGINES.

SPECIFICATION forming part of Letters Patent No. 264,356, dated September 12, 1882.

Application filed June 1, 1882. (No model.) Patented in England June 5, 1877, No. 2,184.

*To all whom it may concern:*

Be it known that I, JAMES HENRY SMITH, a citizen of England, residing at Euston Road, in the county of Middlesex, England, have invented a new and useful Improved Governor for Marine Engines, (for which I have obtained a patent in Great Britain, No. 2,184, bearing date June 5, 1877,) of which the following is a specification.

My invention has for its object to prevent the "racing" of marine engines when by the pitching of the vessel or by the passing of large waves the screw-propeller is for the time raised partly or wholly out of the water, whereby the work is more or less entirely taken off the engines. For this purpose I fix at or near the stern of the ship, either inside or outside the same, a vertical cylinder or tube, the lower end of which communicates with the water outside, and in this tube I provide a float having a rod which is connected by a cord, chain, or other suitable means of connection to the lever of a throttle or equilibrium valve on the steam-pipe of the engines in such manner that when the float falls in the pipe the valve will be thereby caused to close and cut off the supply of steam to the engines, while when the float rises again the valve will be opened. The said float is so arranged in the tube relatively to the water-line of the vessel that so long as the propeller is under water the float shall also be under water, and prevented from rising beyond a certain point either by stops in the tube or by other suitable known means. Thus so long as the propeller is under water no rolling or pitching of the vessel will cause the float to rise or fall, and any unnecessary actuation of the throttle-valve of the engine will by this means be prevented, the said valve being under such circumstances held permanently in its open position by the float, and being only actuated when either by the raising of the stern out of the water or by the passing of a large wave sufficient to uncover the propeller wholly or partially the water sinks in the tube to such an extent as to allow the float to fall away from its stops.

In the drawings, Figure 1 shows a part longitudinal section of a steamship with my invention applied thereto, and Fig. 2 shows an end view of the governing apparatus.

A is the tube or cylinder containing the float or piston B, working loosely therein, the tube being open at its lower end, B', to the water outside at a point by preference near the propeller C, so that as long as the propeller is immersed in the water the float will be kept up by the upward pressure of the water against the stop D, fixed in the tube, the said stops being fixed at a point level with or somewhat below the tops of the propeller-blades. To the upper side of the float is attached a rod, E, the upper end of which passes through a guide on the top of the cylinder, and is connected to a lever, F, on a light spindle, G, which extends forward in the vessel to the engine-room, where it is provided with another lever, H, that is connected by a rod to the lever of a throttle-valve, I, of the steam-pipe. Thus it will be seen that so long as the propeller is immersed the float will be maintained in the position shown on the drawings, keeping the throttle-valve full open, as shown in full lines at Fig. 2; but as soon as, by the pitching of the vessel or by the passing of the wave, the screw is partially or wholly uncovered, the water will sink to a corresponding extent in the tube, so as to allow the float to fall, and this will cause the spindle G to turn, so as to effect the closing of the throttle-valve, as indicated by the dotted lines.

It will be evident that instead of controlling the float by means of stops inside the tube or cylinder B, this may be effected by stops acting upon the spindle of the connecting-levers of the apparatus.

The lever F may be provided with a counter-weight, as shown, for partially balancing the weight of the float; and in order to reduce the power required for turning the spindle G as much as possible, when this is of any considerable length, it may be supported on anti-friction rollers instead of in ordinary bearings.

If necessary, a second throttle-valve or equilibrium-valve may be provided in the steam-pipe, operated by the ordinary engine-governor.

If necessary, the stops D may be made adjustable in height in the tube B, so as to allow the position of the float relatively to the tops of the propeller-blades being adjusted as may be found desirable.

I am aware that it is not new to arrange a float within a cylinder which communicates at its lower end with the outer water, the upper end of the cylinder being closed and a stem on the float connecting by mechanism with the regulating-valve in the steam-pipe of the engine which operates the propeller of the vessel; but in such arrangement the float has not been held intermediate the ends of the cylinder by fixed stops; and, moreover, in order that the float shall operate, there must be a body of air confined in the upper end of the cylinder, which becomes compressed when the propeller is entirely immersed, and acts as a cushion, which elastic cushion causes the water-level and float to move up and down at the slightest change of water-level, whether the propeller be immersed or not. Such therefore is not my invention, and is not claimed by me.

I claim—

The combination of the tube or cylinder communicating at its bottom with the outer water near the propeller, and provided interiorly between its ends with stops or their equivalents, a float arranged within the cylinder or tube, and held in a fixed position against the stops by the pressure of the water so long as the propeller and the float are immersed beneath the outer water, and devices connecting the float with the regulating-valve in the steam-pipe, substantially as described.

In testimony whereof I have signed my name to this specification, in the presence of two subscribing witnesses, this 17th day of May, A. D. 1882.

J. H. SMITH.

Witnesses:
 JOHN DEAN,
 J. WATT,
  *Both of* 17 *Gracechurch St., London.*